Dec. 27, 1949  L. A. AMTSBERG  2,492,678
LOW INERTIA INDUCTION MOTOR
Filed April 5, 1945

INVENTOR
LESTER A. AMTSBERG.
BY
Raymond G. Mullee
ATTORNEY

Patented Dec. 27, 1949

2,492,678

UNITED STATES PATENT OFFICE 2,492,678

LOW INERTIA INDUCTION MOTOR

Lester A. Amtsberg, Cleveland, Ohio, assignor to Chicago Pneumatic Tool Company, New York, N. Y., a corporation of New Jersey Application April 5, 1945, Serial No. 586,791

2 Claims. (Cl. 172—120)

This invention relates to electric motors and particularly to induction motors designed for actuating aircraft controls. On a large airplane there are numerous kinds of units actuated by electric motors under remote control, for example, landing gear, tail skid, bomb doors, turrets, supercharger valves, spark advance, propeller shift, engine air flaps, oil cooler flaps, throttle, fuel mixture, landing flaps, etc. In the conventional actuating systems the motor comprises a rotor or core of the squirrel cage type consisting of laminations of magnetic material which are stacked in alignment and slotted to receive longitudinally extending conductor bars. Since the laminae must be made of iron, the rotor has considerable weight and inertia which manifests itself by coasting or continuing to rotate after the stator current is turned off. In order to prevent the controls from being moved beyond the intended position of adjustment, or being subjected to shock, it is customary to provide a magnetic brake or clutch either to dissipate the kinetic energy of the coasting rotor or to disconnect it from the control which it actuates. Frequently the brake must be centrifugally energized in order to leave the motor free for manual operation. This extra mechanism adds considerable weight which is a critical item in aircraft design. It also means greater size, cost and complexity.

The general object of the present invention is the provision of a rotor having an inertia so low, in relation to the power output, that no special means for stopping it or disconnecting it from the driven control device is required. To this end the rotor is so constructed that the conducting element and the magnetic core are separate. In accordance with a feature of this invention the conducting element is constructed in the form of a thin shell interposed between the iron core and the stator and supported at both ends on the rotor shaft.

A further object is to increase the efficiency of a motor of the described type by reducing the core loss. To this end the iron core is mounted to rotate on the rotor shaft independently of the conducting element or rotor, whereby the flux frequency in the shell is minimized.

Other objects and features of the invention will appear more clearly from the following description taken in connection with the accompanying drawing and appended claims.

Figure 1:
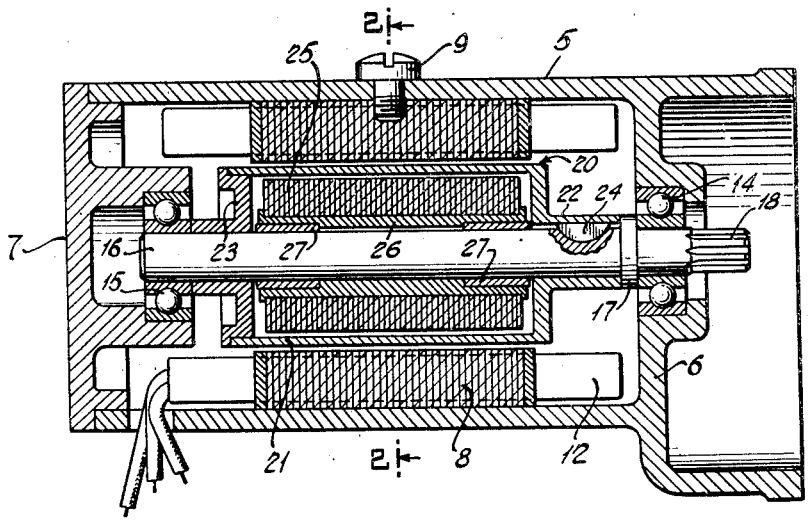
Figure 2:
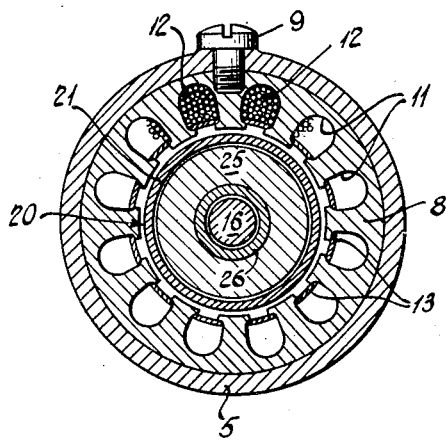

In said drawing:

Fig. 1 is a longitudinal section through an induction motor embodying the invention; and Fig. 2 is a section taken on the line 2—2 of Fig. 1.

In the illustrative embodiment of the invention, the motor is enclosed within a housing 5 having an integral wall 6 at one end and adapted to be closed at its other end by a housing cap 7. A stator 8 is fitted within said housing and secured thereto by a screw 9. The stator, which is of conventional construction, comprises laminated iron stampings stacked in alignment to provide longitudinal slots 11 suitable for the reception of windings 12 and slot closers 13. Ball bearings 14 and 15 are mounted in the housing end wall 6 and housing cap 7 respectively and serve to support a rotor shaft 16. The shaft has an integral collar 17 abutting against the bearing 14. It also has an extension 18 projecting beyond the end wall 6 and shaped to provide a power take-off. The projecting end actuates the control device (not shown) which may be embodied in any one of numerous parts of an airplane as aforementioned.

In accordance with the present invention the shaft is driven by a rotor which has a low inertia whereby the shaft starts and stops almost immediately in response to the closing and opening respectively of the circuit through the stator windings, and whereby the control device is not carried beyond its intended position by the coasting of the motor. The driving rotor 20 consists of a thin shell of good conducting material such as copper arranged concentrically with the stator 8 and shaft 16 and mounted on the latter. If desired, aluminum may be used in place of copper, notwithstanding its higher resistivity, as it has the advantage of reduced weight and inertia. The shell 20 comprises a cylindrical portion 21 having a close running clearance within stator 8, an integral reduced end portion 22 fitted on rotor shaft 16, and a cap 23 which closes the other end of the cylindrical portion and also fits on the shaft 16. The free ends of the cap 23 and integral end portion 22 abut against ball bearing 15 and rotor shaft collar 17 respectively to retain the shaft 16 and shell 20 against axial movement relative to each other and to motor housing 5. The end portion 22 is drivingly connected to the rotor shaft by means of a key 24. The cap 23 is secured to the cylinder 21 and to the shaft 16 by a press fit.

Enclosed within the rotor shell 20 and slightly spaced therefrom is a floating core 25 comprising soft iron laminae stacked on a sleeve 26. One end of the sleeve has an external flange or shoulder and the other end is peened over to clamp the laminations together. The sleeve 26 surrounds the rotor shaft 16 and is slightly spaced therefrom at the intermediate portion of the sleeve. The end portions of the latter are recessed to receive self-lubricating bearings 27. The bearings, which are known to the trade under the name "Oilite," are held to the sleeve by a press fit and rotate on the shaft 16.

In operation the windings 12 are connected to a suitable source of alternating current which produces a rotating magnetic field. It has been found desirable to design the motor to operate on three-phase current at 400 cycles per second, although it should be understood the invention is applicable to any induction motor either single phase or poly-phase and is not limited to any specific frequency range. The effect of the rotating field is to induce electric currents in the metallic rotor shell 20 which in turn have the effect of imparting rotation to the shell. The floating core 25 serves to convey magnetic flux from one pole of the stator 8 to another. The rotating field of the stator has the tendency to rotate the core 25 as well as the shell 20 by induction. In accordance with a feature of this invention, this tendency is not opposed and the core is permitted to turn relative to the stator 8 and independently of the shaft 16.

When the current is interrupted in the windings 12, the magnetic field is broken and the small kinetic energy in the light weight shell 20 is quickly absorbed by the load, thereby stopping the rotor shell 20 and shaft 16. The magnetic core 25 continues to rotate on its bearings until its energy is dissipated by friction.

By permitting the iron core 25 to rotate relative to the stator 8, there is a reduction in core loss as a result of the lower flux frequency in the core. With a stationary core the flux frequency would be equal to the stator frequency while in the rotating core it is the slip frequency, which is less than 10 percent of the stator frequency.

It is important in the design of an induction motor that the air gap between the rotor and stator be held to a minimum to avoid excessive magnetic reluctance, which would necessitate excessive magnetizing current for the production of the desired torque. In the illustrative embodiment of the invention, there is a considerable gap between the stator 8 and the iron core 25 resulting from the introduction of the non-magnetic shell 20. This gap is minimized, however, by making the shell as thin as possible and by supporting the shell at both ends in such a manner as to prevent breakage or deformation. Consequently the increase in magnetizing current, as compared with the conventional squirrel cage rotor, is not excessive and is more than offset by the reduction in power consumption due to the elimination of the magnetic clutch or brake heretofore employed to prevent the rotor from coasting upon interruption of the power.

What is claimed is:

1. A low inertia induction motor comprising a housing having spaced bearings, a shaft mounted for rotation in said bearings and having an extension providing a power take-off adapted to actuate a control device, a core of cylindrical shape coaxial with the shaft and comprising soft iron laminae stacked on a sleeve, the sleeve having an intermediate portion slightly spaced from the shaft and having recessed end portions, self-lubricating bearings in the end portions providing means for rotatively mounting the core on the shaft, a stator surrounding the core in spaced relation to provide an annular magnetic gap therebetween, said stator being adapted for the generation of a high frequency rotating magnetic field, a light weight rotor drivingly connected to the shaft, said rotor having a conducting shell mounted in the annular gap, the shell being thin and closely spaced relative to the core and stator to minimize the length of gap, said core being out of driving engagement with the shaft whereby to minimize the moment of inertia associated with the shaft, said core being revolvable on the shaft under the influence of the magnetic field set up by the stator and being adapted to continue rotating after the shell and shaft have been brought to rest.

2. A low inertia induction motor comprising a housing having spaced bearings in axial alignment, a shaft mounted for rotation in said bearings having an end providing a power take-off, a ferrous core of cylindrical shape being positioned coaxially with respect to said shaft, said core comprising laminations stacked on a sleeve provided with recessed end portions, self lubricating bearing means positioned in said recessed end portions of the sleeve for rotatably mounting said core on said shaft, a stator surrounding said core in spaced relationship to provide an annular gap therebetween, said stator being adapted upon application of electrical excitation thereto for the generation of a rotating magnetic field, and a light weight rotor comprising a cylindrical portion having an integral reduced end portion drivingly secured to the shaft and a cap closing the other end of the cylindrical portion and fitted to the shaft, said rotor being positioned in the annular gap and closely spaced from the core and stator to minimize effective gap reluctance, said core being revolvable under the influence of the rotating magnetic field and being independent of the rotation of the shaft, all being arranged so that following the discontinuance of stator excitation the kinetic energy of the light weight rotor and shaft is quickly absorbed by a load coupled to said power take-off, whereas the kinetic energy of the core is gradually dissipated as a result of the friction of the core bearings.

LESTER A. AMTSBERG.

REFERENCES CITED

The following references are of record in the file of this patent:

UNITED STATES PATENTS

| Number | Name | Date |
|---|---|---|
| 428,650 | Thomson | May 27, 1890 |
| 518,310 | Duncan | Apr. 17, 1894 |
| 541,641 | Still | June 25, 1895 |
| 2,049,261 | Haydon | July 28, 1936 |
| 2,159,768 | Macmillan | May 23, 1939 |